United States Patent
Grohman

(10) Patent No.: US 7,840,311 B2
(45) Date of Patent: *Nov. 23, 2010

(54) METHOD AND APPARATUS FOR CONFIGURING A COMMUNICATING ENVIRONMENTAL CONDITIONING NETWORK

(75) Inventor: Wojciech Grohman, Little Elm, TX (US)

(73) Assignee: Lennox Industries Inc, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/559,438

(22) Filed: Sep. 14, 2009

(65) Prior Publication Data

US 2010/0004787 A1    Jan. 7, 2010

Related U.S. Application Data

(63) Continuation of application No. 11/866,155, filed on Oct. 2, 2007, now Pat. No. 7,590,469.

(51) Int. Cl.
*G05B 21/00* (2006.01)
*G01M 1/38* (2006.01)
*G05B 13/00* (2006.01)
*G05B 15/00* (2006.01)
*G05D 23/00* (2006.01)
*G05D 22/02* (2006.01)
*F23N 5/20* (2006.01)

(52) U.S. Cl. .................. 700/276; 236/44 C; 236/46 R; 236/47; 62/158; 62/176.1

(58) Field of Classification Search ......... 700/275–278; 236/44 R, 44 C, 46 R, 47; 318/471; 62/132, 62/157, 158, 176.1, 181, 129
See application file for complete search history.

(56) References Cited

U.S. PATENT DOCUMENTS

| | | | |
|---|---|---|---|
| 5,279,458 A | 1/1994 | DeWolf et al. | |
| 5,410,230 A | 4/1995 | Bessler et al. | |
| 6,813,631 B2 | 11/2004 | Pouchak et al. | |
| 7,130,719 B2 | 10/2006 | Ehlers et al. | |
| 7,209,870 B2 | 4/2007 | Simmons et al. | |
| 7,212,887 B2 | 5/2007 | Shah et al | |
| 7,296,426 B2 | 11/2007 | Butler et al. | |
| 7,590,469 B2 | 9/2009 | Grohman | |
| 7,623,771 B2* | 11/2009 | Lentz et al. | 392/386 |
| 7,748,225 B2* | 7/2010 | Butler et al. | 62/181 |
| 7,784,291 B2* | 8/2010 | Butler et al. | 62/129 |
| 2007/0012052 A1 | 1/2007 | Butler et al. | |
| 2008/0277486 A1 | 11/2008 | Seem et al. | |
| 2008/0294291 A1 | 11/2008 | Salsbury | |
| 2009/0088901 A1 | 4/2009 | Grohman | |
| 2009/0157529 A1* | 6/2009 | Ehlers et al. | 705/26 |
| 2009/0171862 A1* | 7/2009 | Harrod et al. | 705/412 |
| 2010/0023168 A1* | 1/2010 | Kai et al. | 700/278 |
| 2010/0050628 A1* | 3/2010 | Staffend et al. | 60/508 |
| 2010/0114380 A1* | 5/2010 | Kates | 700/275 |

* cited by examiner

Primary Examiner—Crystal J Barnes-Bullock

(57) ABSTRACT

A method for configuring a communicating environmental conditioning network, an apparatus for such configuring and a method for configuring a communicating air conditioning network are disclosed. In one embodiment, the method for configuring a communicating environmental conditioning network includes: (1) establishing baseline data indicating conditioned outputs of selected space interactive units of the plurality of space interactive units, (2) activating a respective environmental interactive unit of the plurality of environmental interactive units and (3) assigning to the respective environmental interactive unit a respective selected space interactive unit associated with the largest change in a conditioned output.

18 Claims, 3 Drawing Sheets

METHOD AND APPARATUS FOR CONFIGURING A COMMUNICATING ENVIRONMENTAL CONDITIONING NETWORK

REFERENCE TO RELATED APPLICATIONS

The present application is a continuation of U.S. patent application Ser. No. 11/866,155 entitled "METHOD AND APPARATUS FOR CONFIGURING A COMMUNICATING ENVIRONMENTAL CONDITIONING NETWORK" filed on Oct. 2, 2007, by Wojciech Grohman, now U.S. Pat. No. 7,590,469 issued Sep. 15, 2009. The above-mentioned application is commonly assigned with the present application and incorporated herein by reference in its entirety.

TECHNICAL FIELD

The present invention relates to communicating environmental conditioning networks, and especially to initial configuration of such a network to identify which unit serving a respective conditioned space may be controlled by a respective cooperating unit.

BACKGROUND

Communicating environmental conditioning networks typically contain multiple types of devices that are physically coupled together by common air duct, refrigerant lines, etc., comprising separate HVAC systems sharing the same communicating network. It is very difficult to automatically discern which ones of multiple types of devices belong to the same HVAC system.

The invention may be advantageously employed with many environmental conditioning systems including, by way of example and not by way of limitation, dehumidifying systems, humidifying systems, heating systems, cooling systems, ventilating systems and other systems affecting environment in a plurality of spaces. Units serving a conditioned space may be referred to as space interactive units, and may be located within the serviced space or outside of the serviced space. Cooperating units may operate outside the conditioned space, and may be referred to as environmentally interactive units. Space interactive units may communicate with environmentally interactive units outside the conditioned space, and a control unit may communicate via a network coupling with a plurality of space interactive units and environmentally interactive units to effect environmental control of a plurality of spaces from a central locus.

By way of illustrative example and not by way of limitation, the present invention may be described in an exemplary embodiment of a communicating network of heat pump systems. When a communicating environmental conditioning system is initially configured there may be significant time expended to assure that one accurately ascertains the line-up of units. In an exemplary heat pump network, one must accurately ascertain which environmental interactive unit (sometimes referred to as an outdoor unit) is coupled for cooperative operation with which respective space interactive unit (sometimes referred to as an indoor unit).

It would be advantageous to have a method and apparatus for effecting configuration of a communicating environmental conditioning system, such as a communicating heat pump network, in an efficient and timely manner.

SUMMARY

In one aspect, a method for configuring a communicating environmental conditioning network is disclosed. The network may include a plurality of environmental interactive units communicatingly coupled with a plurality of space interactive units, each respective space interactive unit of the plurality of space interactive units presenting a conditioned output when engaged with a particular environmental interactive unit of the plurality of environmental interactive units. In one embodiment, the method may include: (1) establishing baseline data indicating conditioned outputs of selected space interactive units of the plurality of space interactive units, (2) activating a respective environmental interactive unit of the plurality of environmental interactive units and (3) assigning to the respective environmental interactive unit a respective selected space interactive unit associated with the largest change in a conditioned output.

In another aspect, a method for configuring a communicating air conditioning network is disclosed. The network may include a plurality of outdoor units interacting with an environment outside at least one conditioned space and coupled with a plurality of indoor units interacting with the at least one conditioned space; each respective indoor unit of the plurality of indoor units employing a respective fan element for presenting a conditioned output when engaged with a particular outdoor unit of the plurality of outdoor units. In one embodiment, the method may include: (1) establishing a baseline data set indicating conditioned outputs of the selected indoor units, (2) activating a respective outdoor unit of the plurality of outdoor units and (3) assigning to the respective outdoor unit the selected indoor unit associated with the largest change in the conditioned output.

In yet another aspect, an apparatus for configuring a communicating environmental conditioning network is disclosed. The network may include a plurality of environmental interactive units communicatingly coupled with a plurality of space interactive units and a network control unit, each respective space interactive unit presenting a conditioned output when engaged with a particular environmental interactive unit. In one embodiment, the apparatus may include: (1) a data collecting unit coupled with the network control unit for establishing baseline data indicating conditioned outputs of the selected space interactive units, (2) an engaging unit coupled with the network control unit for engaging at least one respective space interactive unit of the selected space interactive units with a respective environmental interactive unit of the plurality of environmental interactive units and (3) a selecting unit coupled with the network control unit for selecting the respective the selected space interactive unit associated with the largest change in the conditioned output for assigning to the respective environmental interactive unit.

It is, therefore, a feature of the invention to provide a method and apparatus for effecting configuration of a communicating environmental conditioning system, such as a communicating heat pump network, in an efficient and timely manner.

Further features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

Reference is now made to the following descriptions taken in conjunction with the accompanying drawings, in which.

DETAILED DESCRIPTION

For purposes of this description the term "furnace" is intended to include, by way of example and not by way of limitation, a space interactive unit having a gas or oil heat exchanger and fan. When a heating unit is employed with an environmental interactive unit such as, by way of example and not by way of limitation, a heat pump unit, the gas or oil heat exchanger in the furnace may be employed as a back-up unit to handle very cold days beyond the capability of the heat pump unit to meet demand in the conditioned space.

For purposes of this description the term "air handler unit" is intended to include, by way of example and not by way of limitation, a space interactive unit having a fan. An air handler unit may also include a heating element. A heating element in an air handler unit may be embodied in an electric heating element.

For purposes of this description the term "HVAC indoor unit" is intended to include, by way of example and not by way of limitation, a furnace or an air handler.

For purposes of this description the term "air conditioner" is intended to include, by way of example and not by way of limitation, an environmentally interactive unit having a compressor, a fan and a set of refrigerant lines connected with an indoor coil and being configured for cooling the indoor coil.

For purposes of this description the term "heat pump" is intended to include, by way of example and not by way of limitation, an environmentally interactive unit having a compressor, a fan and a set of refrigerant lines connected with an indoor coil with ability to cool and heat the indoor coil.

For purposes of this description the term "HVAC outdoor unit" is intended to include, by way of example and not by way of limitation, a heat pump or an air conditioner.

For purposes of this description the term "humidifier" is intended to include, by way of example and not by way of limitation, an environmentally interactive unit having an ability to increase humidity in a conditioned space.

For purposes of this description the term "dehumidifier" is intended to include, by way of example and not by way of limitation, an environmentally interactive unit having an ability to decrease humidity in a conditioned space.

For purposes of this description the term "a zoning panel" is intended to include, by way of example and not by way of limitation, a control unit with dampers attached to it having the ability to regulate the flow of conditioned air into multiple areas of a building, called zones. For purposes of this description the term "}VAC accessory unit" is intended to include, by way of example and not by way of limitation, a humidifier, a dehumidifier or a zoning panel.

Figure 1:
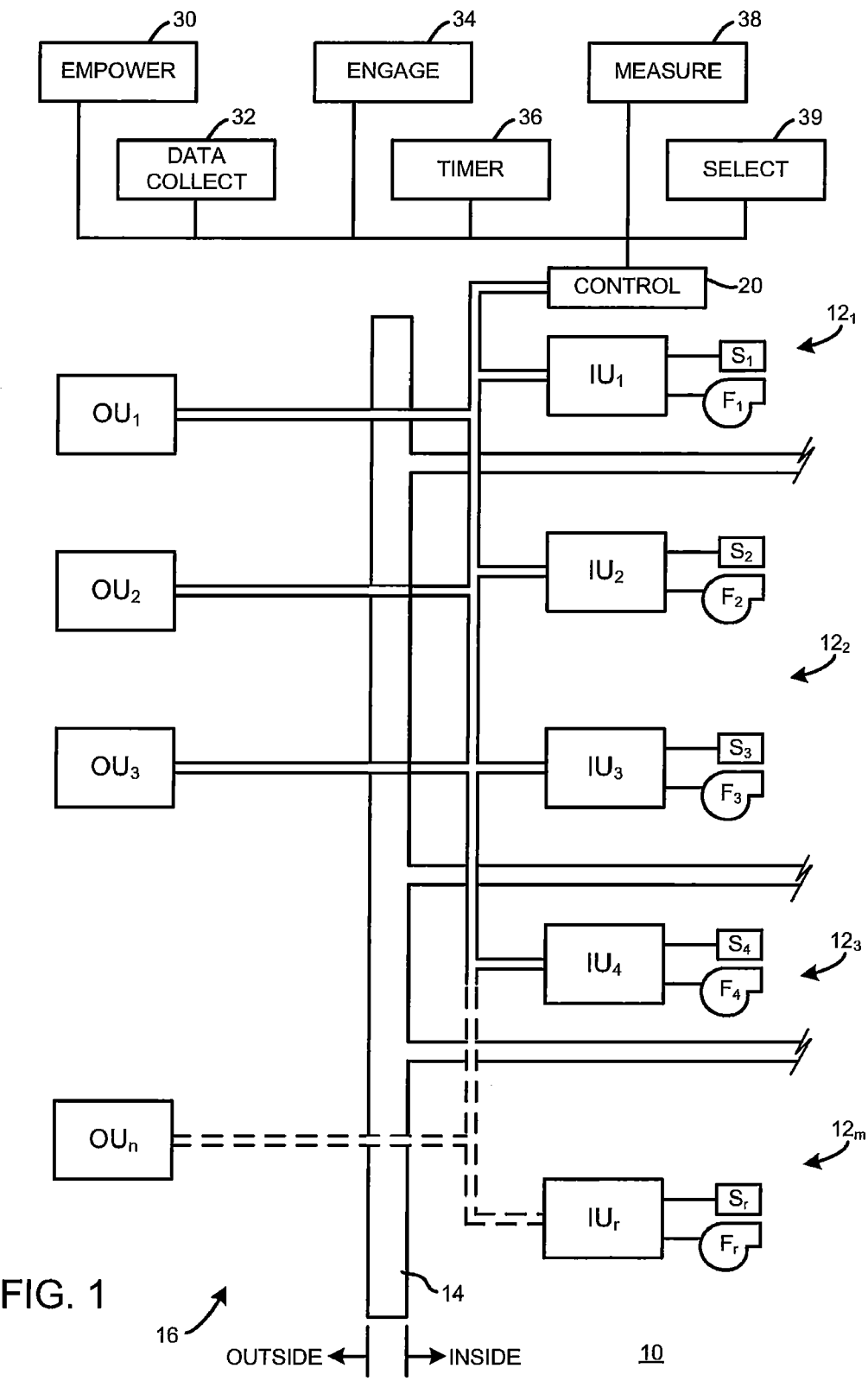
FIG. 1 is a schematic diagram of a communicating environmental conditioning network employing the present invention.

FIG. 1 is a schematic diagram of a communicating environmental conditioning network employing the present invention. In FIG. 1, a communicating environmental conditioning network 10 is installed to condition an environmental parameter in a plurality of inside spaces $12_1$, $12_2$, $12_3$, $12_m$ defined by a wall structure 14. The indicator "m" is employed to signify that there can be any number of inside spaces conditioned by environmental conditioning network 10. The inclusion of four inside spaces $12_1$, $12_2$, $12_3$, $12_m$ in FIG. 1 is illustrative only and does not constitute any limitation regarding the number of inside spaces that may be served by the environmental conditioning network of the present invention. Wall system 14 separates inside spaces $12_1$, $12_2$, $12_3$, $12_m$ from each other and from an outside space 16.

Inside space $12_1$ is conditioned by a space interactive unit $IU_1$. Space interactive unit 1 $U_1$ may be referred to as an indoor unit and may be configured for effecting, by way of example and not by way of limitation, heating, cooling, humidifying, dehumidifying or otherwise conditioning inside space $12_1$. Space interactive unit $115_1$ may be coupled with a sensor unit $S_1$ and a delivery unit $F_1$. By way of example and not by way of limitation, sensor $S_i$ may be embodied in a thermostat, a humidistat, an intake or an exhaust sensor or another sensor for setting a level of environmental conditioning to be effected and maintained by space interactive unit Rh. Delivery unit $F_1$ may be embodied, by way of example and not by way of limitation, in a fan unit.

Inside space $12_2$ is conditioned by space interactive units $IU_2$, $IU_3$. Space interactive units $IU_2$, $IU_3$ may be configured for effecting, by way of example and not by way of limitation, heating, cooling, humidifying, dehumidifying or otherwise conditioning inside space $12_2$. Space interactive units $IU_2$, $IU_3$ may be coupled with sensor units S2, S3 and delivery units F2, F3. By way of example and not by way of limitation, sensors S2, S3 may each be embodied in a thermostat, a humidistat, an intake or an exhaust sensor or another sensor for setting a level of environmental conditioning to be effected and maintained by space interactive units $IU_2$, $IU_3$. Delivery units $F_2$, F3 may each be embodied, by way of example and not by way of limitation, in a fan unit. Inside space $12_3$ is conditioned by a space interactive unit IU4. Space interactive unit $111_4$ may be referred to as an indoor unit and may be configured for effecting, by way of example and not by way of limitation, heating, cooling, humidifying, dehumidifying or otherwise conditioning inside space $12_3$. Space interactive unit $IU_4$ may be coupled with a sensor unit S4 and a delivery unit F4. By way of example and not by way of limitation, sensor S4 may be embodied in a thermostat, a humidistat, an intake or an exhaust sensor or another sensor for setting a level of environmental conditioning to be effected and maintained by space interactive unit 1U4. Delivery unit F4 may be embodied, by way of example and not by way of limitation, in a fan unit.

Inside space $12_m$ is conditioned by a space interactive unit $IU_r$. Space interactive unit 115, may be referred to as an indoor unit and may be configured for effecting, by way of example and not by way of limitation, heating, cooling, humidifying, dehumidifying or otherwise conditioning inside space $12_m$. Space interactive unit $IU_r$ may be coupled with a sensor unit $S_r$ and a delivery unit $F_r$. By way of example and not by way of limitation, sensor $S_r$ may be embodied in a thermostat, a humidistat, an intake or an exhaust sensor or another sensor for setting a level of environmental conditioning to be effected and maintained by space interactive unit $IU_r$. Delivery unit $F_r$ may be embodied, by way of example and not by way of limitation, in a fan unit. The indicator "r" is employed to signify that there can be any number of space interactive units included in environmental conditioning network 10. The inclusion of five space interactive units 11J1, $IU_2$, $IU_3$, $111_4$, $IU_r$, in FIG. 1 is illustrative only and does not constitute any limitation regarding the number of space interactive units that may be served by the environmental conditioning network of the present invention.

A plurality of environmental interactive units $OU_1$, $OU_2$, $OU_3$, $OU_n$ cooperate with space interactive units $IU_i$, $IU_2$, $IU_3$, $111_4$, $IU_r$ to environmentally condition inside spaces $12_1$, $12_2$, $12_3$, $12_m$. Environmental interactive units $OU_i$, OU2, $OU_3$, $OU_n$ may be referred to as outdoor units. The indicator "n" is employed to signify that there can be any number of environmental interactive units included in environmental conditioning network 10. The inclusion of four environmental interactive units $OU_1$, $OU_2$, $OU_3$, Olin in FIG. 1 is illustrative only and does not constitute any limitation regarding the number of environmental interactive units that may be served by the environmental conditioning network of the present invention.

Environmental conditioning network 10 also includes a control unit 20 for effecting control of environmental conditioning network 10. An empowering unit 30 may be coupled with control unit 20 for powering up selected portions or components of environmental conditioning network 10, such as turning on selected delivery units Fr associated with selected space interactive units $IU_r$. Empowering unit 30 may be integrally included as part of control unit 20 embodied in software, firmware, hardware or any combination of software, firmware and hardware.

A data collecting unit 32 may be coupled with control unit 20 for collecting data relating to operation of environmental conditioning network 10 or its component parts, such as space interactive units $Ki_r$ or environmental interactive units $OU_R$. Data collecting unit 32 may be integrally included as part of control unit 20 embodied in software, firmware, hardware or any combination of software, firmware and hardware.

An engaging unit 34 may be coupled with control unit 20 for engaging selected space interactive units 111, —with a respective environmental interactive unit OUR. Engaging unit 34 may be integrally included as part of control unit 20 embodied in software, firmware, hardware or any combination of software, firmware and hardware.

A timer unit 36 may be coupled with control unit 20 for measuring elapsed time or time intervals associated with operation of environmental conditioning network 10. Timer unit 36 may be integrally included as part of control unit 20 embodied in software, firmware, hardware or any combination of software, firmware and hardware.

A measuring unit 38 may be coupled with control unit 20 for measuring a conditioned output from selected space interactive units ITT. Measuring unit 38 may be integrally included as part of control unit 20 embodied in software, firmware, hardware or any combination of software, firmware and hardware.

A selecting unit 39 may be coupled with control unit 20 for selecting selected component parts of environmental conditioning network 10, such as space interactive units '$U_r$ or environmental interactive units $OU_R$. Selecting unit 39 may be integrally included as part of control unit 20 embodied in software, firmware, hardware or any combination of software, firmware and hardware.

Figure 2:
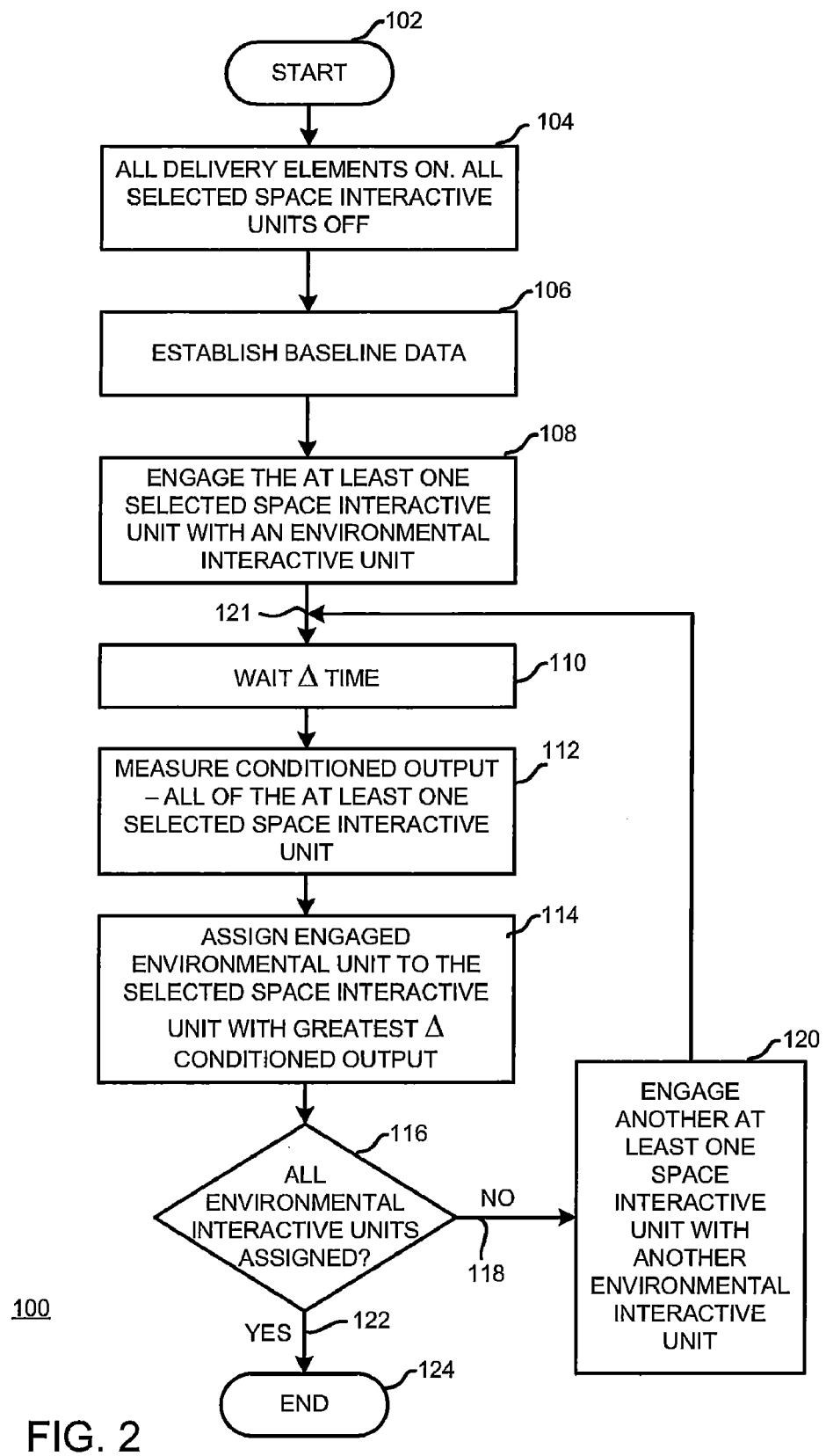
FIG. 2 is a flow chart illustrating a first embodiment of the method of the invention.

FIG. 2 is a flow chart illustrating a first embodiment of the method of the invention. In FIG. 2, a method 100 for configuring a communicating environmental conditioning network begins at a START locus 102. The network includes a plurality of environmental interactive units communicatingly coupled with a plurality of space interactive units. Each respective space interactive unit of the plurality of space interactive units presents a conditioned output when engaged with a particular environmental interactive unit of the plurality of environmental interactive units.

Method 100 continues with turning on selected delivery units associated with selected space interactive units of the plurality of space interactive units, as indicated by a block 104. Method 100 continues by establishing baseline data indicating conditioned outputs of the selected space interactive units, as indicated by a block 106.

Method 100 proceeds by engaging at least one respective space interactive unit of the selected space interactive units with a respective environmental interactive unit of the plurality of environmental interactive units, as indicated by a block 108.

Method 100 continues by waiting a predetermined time interval, as indicated by a block 110. Method 100 continues with measuring a conditioned output associated with each the selected delivery unit, as indicated by a block 112. Method 100 proceeds with selecting the respective selected space interactive unit associated with the largest change in the conditioned output as assigned to the respective environmental interactive unit, as indicated by a block 114.

Method 100 may continue by posing a query whether all environmental interactive units have been assigned with a space interactive unit, as indicated by a query block 116. If not all respective environmental interactive units of the plurality of environmental interactive units have been assigned with a space interactive unit, method 100 proceeds from query block 116 via a NO response line 118 and engages another respective environmental interactive unit with other respective space interactive units, as indicated by a block 120. Method 100 thereafter proceeds to a locus 121 and performs steps represented by blocks 110, 112, 114, 116.

If all environmental interactive units have been assigned with a space interactive unit, method 100 proceeds from query block 116 via a YES response line 122 and terminates at an END locus 124.

Figure 3:
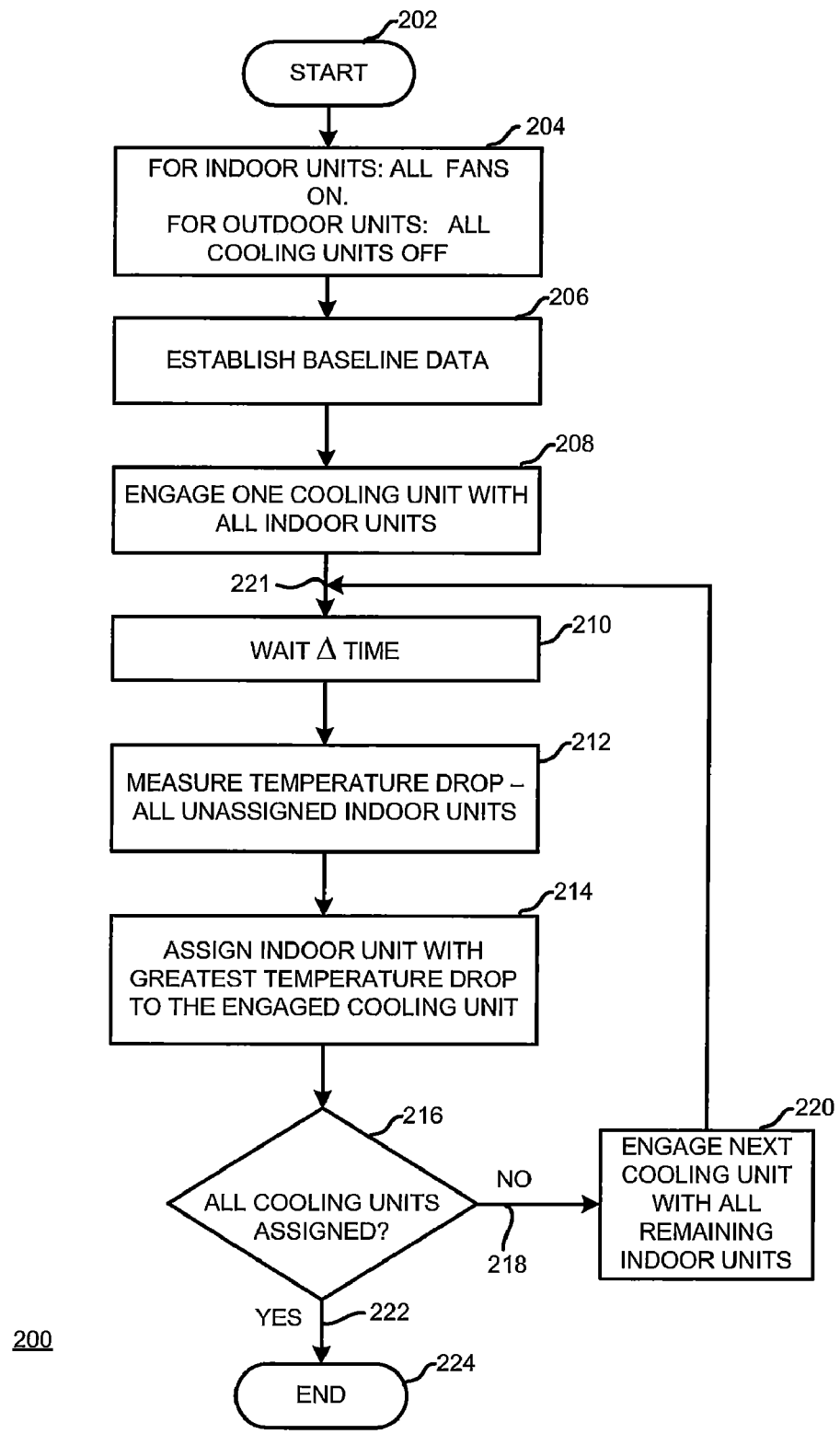
FIG. 3 is a flow chart illustrating a second embodiment of the method of the invention.

FIG. 3 is a flow chart illustrating a second embodiment of the method of the invention. In FIG. 3, a method 200 for configuring a communicating air conditioning network, such as a communicating heat pump network operating in a cooling mode, begins at a START locus 202. The network includes a plurality of outdoor units situated outside at least one conditioned space and coupled with a plurality of indoor units situated inside the at least one conditioned space. Each respective indoor unit of the plurality of indoor units employs a respective fan unit for presenting a conditioned output when engaged with a particular outdoor unit of the plurality of outdoor units. Method 200 continues by turning on selected fan units associated with selected indoor units of the plurality of indoor units, as indicated by a block 204.

Method 200 continues with establishing a baseline data set indicating conditioned outputs of the selected indoor units, as indicated by a block 206. Method 200 proceeds by engaging one respective outdoor unit of the selected outdoor units with all indoor units, as indicated by a block 208. Method 200 continues by waiting a predetermined time interval, as indicated by a block 210.

Method 200 continues with measuring the conditioned output associated with each respective indoor unit, as indicated by a block 212. Method 200 proceeds with selecting the respective indoor unit associated with the largest change in the conditioned output as assigned to the respective outdoor unit, as indicated by a block 214.

Method 200 may continue by posing a query whether all respective outdoor units of the plurality of outdoor units have been assigned with an indoor unit, as indicated by a query block 216.

If not all respective outdoor units of the plurality of outdoor units have been assigned with an indoor unit, method 200 may proceed from query block via a NO response line 218 and may engage all remaining indoor units with another respective outdoor unit, as indicated by a block 220. Method 200 thereafter proceeds to a locus 221 and performs steps represented by blocks 210, 212, 214, 216.

If all respective outdoor units of the plurality of outdoor units have been assigned with an indoor unit, method 200 may proceed from query block via a YES response line 222 and terminates at an END locus 224.

Thus, an embodiment of the present invention is a process for effecting automatic assignment of an outdoor unit (e.g., heat pump or air conditioner) or an accessory (e.g., humidifier or dehumidifier or a zoning panel) to its corresponding indoor unit (e.g., a furnace or air handler) in a multi HVAC (Heating Ventilating Air Conditioning) system communicating network.

An embodiment of the method requires an indoor unit (e.g., a furnace, air handler or equivalent delivery unit) to have a communicating controller and a post-coil (discharge) temperature sensor.

An embodiment of the method works in a communicating network that spans over multiple HVAC systems defined as, at a minimum, a communicating indoor unit and a communicating controller such as a thermostat.

An embodiment of the method works on devices that require no manual configuration prior to being set up in a building or other operational site. Upon system power up the first time after installation, or at a given time afterwards, the indoor unit (e.g., furnace, air handler or similar device that is equipped with a blower fan or other delivery device) should be assigned to an outdoor unit to which the indoor unit is coupled by refrigerant lines. It is sometimes difficult to advise each respective controller immediately following installation which outdoor unit is connected to which indoor unit.

An embodiment of the method may involve turning on all blower fans in all indoor units on the network and watching the readings from their post-coil discharge sensors. First, a baseline temperature record is established for all indoor units that are turned on. Then, one outdoor unit is turned on in cooling mode and all indoor units are monitored at their respective post-coil discharge sensors. The indoor unit with the largest relative temperature drop detected by its post-coil sensor is assigned to the then-active outdoor unit. The process may be repeated for all outdoor units with all remaining, unassigned indoor units blowing the air until all connections are determined.

An alternate embodiment of the above-described method may involve turning on cooling mode for a first set of multiple outdoor units at the same time followed by a break (i.e., wait for a time interval) and then turning on cooling mode for a second set of multiple cooling units, and then sequentially turning on cooling mode for other sets of multiple cooling units as necessary. From patterns of cooling detected at post-coil discharge sensors of various indoor units while turning on cooling mode for various sets of outdoor units one may determine the indoor unit-outdoor unit association in larger systems more quickly than performing the method one indoor unit at a time, as described above.

It is to be understood that, while the detailed drawings and specific examples given describe embodiments of the invention, they are for the purpose of illustration only, that the apparatus and method of the invention are not limited to the precise details and conditions disclosed and that various changes may be made therein without departing from the spirit of the invention which is defined by the following claims:

What is claimed is:

1. A method for configuring a communicating environmental conditioning network; said network including a plurality of environmental interactive units communicatingly coupled with a plurality of space interactive units; each respective space interactive unit of said plurality of space interactive units presenting a conditioned output when engaged with a particular environmental interactive unit of said plurality of environmental interactive units; the method comprising:
   (a) establishing baseline data indicating conditioned outputs of selected space interactive units of said plurality of space interactive units;
   (b) activating a respective environmental interactive unit of said plurality of environmental interactive units; and
   (c) assigning to said respective environmental interactive unit a respective selected space interactive unit associated with the largest change in a conditioned output.

2. A method for configuring a communication environmental conditioning network as recited in claim 1 further comprising waiting a predetermined time interval after activating said respective environmental interactive unit before said assigning.

3. A method for configuring a communicating environmental conditioning network as recited in claim 1 further comprising repeating said activating and said assigning for each of said plurality of environmental interactive units.

4. A method for configuring a communicating environmental conditioning network as recited in claim 1 wherein said plurality of space interactive units includes a plurality of HVAC indoor units.

5. A method for configuring a communicating environmental conditioning network as recited in claim 1 wherein said plurality of environmental interactive units is a plurality of HVAC outdoor units.

6. A method for configuring a communicating environmental conditioning network as recited in claim 1 wherein said plurality of environmental interactive units is a plurality of HVAC accessory units.

7. A method for configuring a communicating environmental conditioning network as recited in claim 1 wherein each of said plurality of environmental interactive units includes an associated delivery element.

8. A method for configuring a communicating air conditioning network; said network including a plurality of outdoor units interacting with an environment outside at least one conditioned space and coupled with a plurality of indoor units interacting with said at least one conditioned space; each respective indoor unit of said plurality of indoor units employing a respective fan element for presenting a conditioned output when engaged with a particular outdoor unit of said plurality of outdoor units; the method comprising:
   a. establishing a baseline data set indicating conditioned outputs of said selected indoor units;
   b. activating a respective outdoor unit of said plurality of outdoor units; and
   c. assigning to said respective outdoor unit said selected indoor unit associated with the largest change in said conditioned output.

9. A method for configuring a communicating air conditioning network as recited in claim 8 wherein the method further comprises waiting a predetermined time interval after activating said respective outdoor unit before said assigning.

10. A method for configuring a communicating air conditioning network as recited in claim 8 further comprising repeating said activating and said assigning for each of said plurality of outdoor units.

11. An apparatus for configuring a communicating environmental conditioning network; said network including a plurality of environmental interactive units communicatingly coupled with a plurality of space interactive units and a network control unit; each respective space interactive unit of said plurality of space interactive units presenting a conditioned output when engaged with a particular environmental interactive unit of said plurality of environmental interactive units; the apparatus comprising:

a data collecting unit coupled with said network control unit for establishing baseline data indicating conditioned outputs of said selected space interactive units;

an engaging unit coupled with said network control unit for engaging at least one respective space interactive unit of said selected space interactive units with a respective environmental interactive unit of said plurality of environmental interactive units; and a selecting unit coupled with said network control unit for selecting the respective said selected space interactive unit associated with the largest change in said conditioned output for assigning to said respective environmental interactive unit.

12. An apparatus for configuring a communicating environmental conditioning network as recited in claim 11 wherein the apparatus further comprises an empowering unit coupled with said network control unit for turning on selected delivery elements associated with selected space interactive units of said plurality of space interactive units.

13. An apparatus for configuring a communicating environmental conditioning network as recited in claim 11 wherein the apparatus further comprises a timer unit coupled with said network control unit for measuring a predetermined time interval for waiting.

14. An apparatus for configuring a communicating environmental conditioning network as recited in claim 13 wherein the apparatus further comprises a measuring unit coupled with said network control unit for, after said predetermined time interval, measuring a conditioned output associated with each of said plurality of space interactive units.

15. An apparatus for configuring a communicating environmental conditioning network as recited in claim 11 wherein the apparatus further comprises a monitoring unit coupled with said network control unit for ascertaining whether all respective environmental interactive units of said plurality of environmental interactive units have been assigned, said engaging unit engaging a next respective at least one said space interactive unit with another respective environmental interactive unit if not all respective environmental interactive units of said plurality of environmental interactive units have been assigned;

said monitoring unit and said engaging unit cooperating to repeat effecting said engaging and said selecting until all respective environmental interactive units have been assigned.

16. An apparatus for configuring a communicating environmental conditioning network as recited in claim 11 wherein said plurality of space interactive units includes a plurality of HVAC indoor units.

17. An apparatus for configuring a communicating environmental conditioning network as recited in claim 11 wherein said plurality of environmental interactive units is a plurality of HVAC outdoor units.

18. An apparatus for configuring a communicating environmental conditioning network as recited in claim 11 wherein said plurality of environmental interactive units is a plurality of HVAC accessory units.

* * * * *